United States Patent [19]
Goebel

[11] Patent Number: 5,717,138
[45] Date of Patent: Feb. 10, 1998

[54] ARRANGEMENT FOR DRIVING A MEASURING SPINDLE OF A BALANCING MACHINE

[75] Inventor: Eickhart Goebel, Pfungstadt, Germany

[73] Assignee: Hofmann Werkstatt-Technik GmbH, Pfungstadt, Germany

[21] Appl. No.: 597,689

[22] Filed: Feb. 6, 1996

Related U.S. Application Data

[63] Continuation of Ser. No. 299,653, Sep. 2, 1994, abandoned.

[30] Foreign Application Priority Data

Sep. 3, 1993 [DE] Germany .................. 43 29 831.1

[51] Int. Cl.⁶ ......................................... G01M 1/22
[52] U.S. Cl. ................................. 73/462; 73/460
[58] Field of Search ........................ 73/462, 460, 468

[56] References Cited

U.S. PATENT DOCUMENTS

| | | | |
|---|---|---|---|
| 3,772,919 | 11/1973 | Senften | 73/457 |
| 3,889,542 | 6/1975 | Carrigan | 73/460 |
| 4,366,707 | 1/1983 | Jarschel | 73/462 |
| 4,435,987 | 3/1984 | Borner et al. | 73/462 |
| 4,480,472 | 11/1984 | Wood | 73/462 |
| 5,355,728 | 10/1994 | Hartmann, Jr. | 73/462 |

FOREIGN PATENT DOCUMENTS 2-27524  2/1990  Japan .

*Primary Examiner*—Hezron E. Williams
*Assistant Examiner*—Helen C. Kwok
*Attorney, Agent, or Firm*—Cushman Darby & Cushman Intellectual Property Group Of Pillsbury Madison & Sutro LLP

[57] ABSTRACT

An arrangement for driving a measuring spindle of a balancing machine has a friction wheel which is drivable by an electric motor and which can be brought into and out of a condition of driving relationship with the measuring spindle. The electric motor and the friction wheel form a motion unit supported movably about a mounting assembly which is disposed on the machine frame structure and which is arranged in displaced relationship with the axis of the rotor of the electric motor. A torque which is produced about the mounting assembly when the rotor of the electric motor is accelerated causes movement of the motion unit thereby to produce the driving connection between the friction wheel and the measuring spindle.

30 Claims, 2 Drawing Sheets

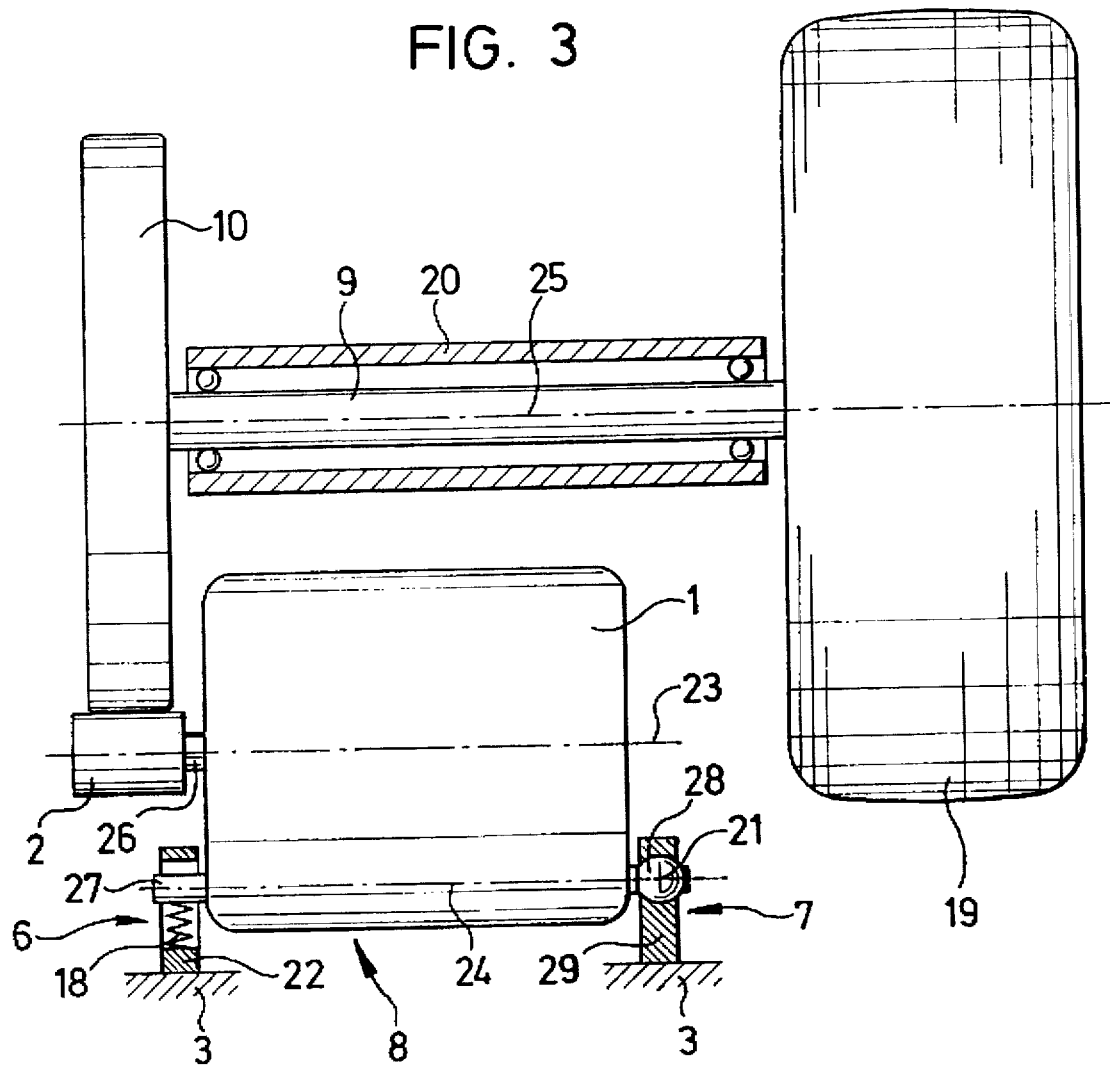

ARRANGEMENT FOR DRIVING A MEASURING SPINDLE OF A BALANCING MACHINE

This is a continuation of application Ser. No. 08/299,653, filed on Sep. 2, 1994 now abandoned, which was abandoned upon the filing hereof.

BACKGROUND OF THE INVENTION

1. Field of the Invention

The present invention is directed to balancing machines for balancing rotary members and, more particularly, to a system for rotating a rotary member such as a vehicle wheel.

2. Description of the Related Art

In balancing machines for balancing rotary members such as for example motor vehicle wheels, the measuring spindle of the machine can be rotatably driven to carry out the balancing operation by means of a friction wheel which is drivable by an electric motor and which can be moved into and out of driving contact with the measuring spindle. One form of arrangement for doing that is to be found, for example, in U.S. Pat. No. 4,480,472 in which the drive connection between the measuring spindle of the balancing apparatus and the friction wheel is produced by way of an additional coupling mechanism operable to move the friction wheel into the driving position. In another arrangement of that kind, to be found in U.S. Pat. No. 4,435,982, the friction wheel is moved into the driving position, in which it is in frictional engagement with the measuring spindle, by means of a gear assembly. However, those arrangements which involve the above-mentioned additional coupling mechanism or the gear assembly suffer from the disadvantages inherent in the provision of additional items of equipment, for example, susceptibility to wear or breakdown.

SUMMARY OF THE INVENTION

An object of the present invention is to provide an arrangement for driving a measuring spindle of a balancing machine which does not suffer from the above-mentioned disadvantages of requiring additional items of equipment therein.

Another object of the present invention is to provide an apparatus for driving a measuring spindle of a balancing machine in which a driving connection between a motor-driven friction wheel and the measuring spindle can be produced in a simple and reliable fashion.

Still another object of the present invention is an arrangement for driving a measuring spindle of a balancing machine in which a driving connection between a driven friction wheel and the measuring spindle is produced by virtue of normal actuation of the machine.

In accordance with the principles of the present invention, the foregoing and other objects are achieved by an arrangement for driving a measuring spindle of a balancing machine comprising a machine frame means, a friction wheel adapted to be brought into and out of driving relationship with the measuring spindle, and an electric motor for driving the friction wheel. The electric motor and the friction wheel constitute a unit, referred to herein as a motion unit, which is supported movably about a support structure on the machine frame means. The support is arranged in a displaced relationship relative to the axis of the rotor of the electric motor. The arrangement is such that the motion unit is movable by a torque generated about the support structure when the rotor of the electric motor is accelerated, thereby producing the frictional driving relationship between the friction wheel and the measuring spindle.

As will be seen in greater detail hereinafter in relation to preferred embodiments of the invention, the friction wheel of the arrangement according to the invention, with which the electric motor forms a motion unit, is moved into the driving position by the torque produced upon acceleration of the rotor of the electric motor. That means that the invention does not require an additional device for moving the friction wheel into the driving position. Accordingly, immediately after the electric motor is switched on, the torque generated upon acceleration of the rotor of the electric motor takes effect so that the friction wheel is moved into the driving position directly after the motor is switched on. The torque for moving the friction wheel into the driving position is produced as a result of a force which acts on the motion unit, upon acceleration of the motor rotor and the friction wheel, at a spacing from the support structure supported on the machine frame means in displaced relationship relative to the axis of the rotor of the electric motor. The support structure thus forms a pivot axis about which the above-mentioned torque acts, to displace the motion unit. That torque thus pivots the motion unit consisting of the friction wheel and the electric motor, about the pivot axis when the electric motor is switched on, whereby the friction wheel comes into driving relationship with the measuring spindle. For that purpose the spindle may be non-rotatably connected to a drive wheel against which the friction wheel, driven by the electric motor, is pressed by the torque generated.

The torque is generated as long as the rotor of the electric motor is accelerated, and thus a force about the pivot axis defined by the motion unit support structure acts on the motion means to produce the appropriate movement thereof. It will be seen therefore that this arrangement ensures that the driving connection between the driven friction wheel and the measuring spindle is brought about automatically upon actuation of the arrangement. That connection is supported or maintained by counter-moments which take effect at the location of frictional engagement and which are produced upon acceleration of the member such as a motor vehicle wheel which is fixed on the measuring spindle. A friction lining on the friction wheel and/or on a drive wheel which is non-rotatably connected to the measuring spindle and which is engaged by the friction wheel may also assist in that respect. The friction wheel may be rigidly or non-rotatably connected to the rotor of the electric motor, or alternatively a transmission means may be disposed between the electric motor and the friction wheel for stepping up or down the speed of rotation thereof.

The motion unit formed by the electric motor and the friction wheel can be mounted on the machine frame structure in such a way that the driving connection between the friction wheel and the measuring spindle is automatically terminated upon conclusion of the acceleration phase; that is to say, for example, when the rotor of the electric motor is rotating at a constant or a falling speed, insofar as, in the absence of acceleration of the rotor of the electric motor and with the resulting disappearance of the rising drive forces previously acting on the friction wheel, there will no longer be any force acting on the motion unit about the pivot axis formed by the support structure thereof, to provide for the frictional engagement between the friction wheel and the measuring spindle.

The motion unit consisting of the electric motor and the friction wheel moves out of the driving position into its rest position in which there is therefore no driving connection between the friction wheel and the measuring spindle, due to the lack of the force which caused the motion unit to be initially moved into and held in the driving position. That operative disengagement of the motion unit can be further promoted by the fact that the motion unit is in effect thrown away from its position of being drivingly connected to the measuring spindle, as a result of further rotary movement of the electric motor rotor which is no longer being accelerated, and therewith further rotary movement of the friction wheel which is coupled to the electric motor rotor. The motion unit can be held in a condition of equilibrium in its rest position. That can be achieved by the motion unit being mounted in the support structure in the manner of a pendulum assembly. The weight of the motion unit is then compensated for in the support structure which thus acts as a form of self-aligning or pendulum bearing means. It is also possible to provide a weight compensating means of a different nature, for example in the form of a spring which is supported on the machine frame means and which, when the rotor of the electric motor and therewith the friction wheel is not being accelerated, moves the motion unit into its rest position in which it is no longer in driving relationship with the measuring spindle.

Since, when the electric motor is switched on, the above-mentioned force resulting from acceleration of the rotor thereof and the friction wheel comes into effect to cause the motion unit and therewith the friction wheel to be moved into the driving position, the arrangement according to the present invention thus provides for automatic movement of the friction wheel into the driving position and likewise automatic movement of the friction wheel out of the driving position, as for example when a desired final speed of rotation of the rotary member to be balanced is reached. The electric motor can be switched off when the desired speed of rotation is reached or at an earlier time and can continue to run on freely after the arrangement moves into the uncoupled condition.

It may be noted at this point that the arrangement according to the invention may advantageously be used in those balancing machines in which the unbalance measurement operation is effected in the phase in which the speed of rotation of the measuring spindle is running down, after the spindle has been uncoupled from the drive subsequent to an acceleration phase in which the spindle has been accelerated to a target value. Such a machine is described, for example, in U.S. Pat. No. 4,480,472 to which reference may accordingly be directed in this respect.

Further objects, features and advantages of the present invention will be apparent from the following description of preferred embodiments.

BRIEF DESCRIPTION OF THE DRAWINGS

FIG. 3 is a diagrammatic view of a further embodiment of the arrangement according to the invention.

DESCRIPTION OF PREFERRED EMBODIMENTS

Figure 1:
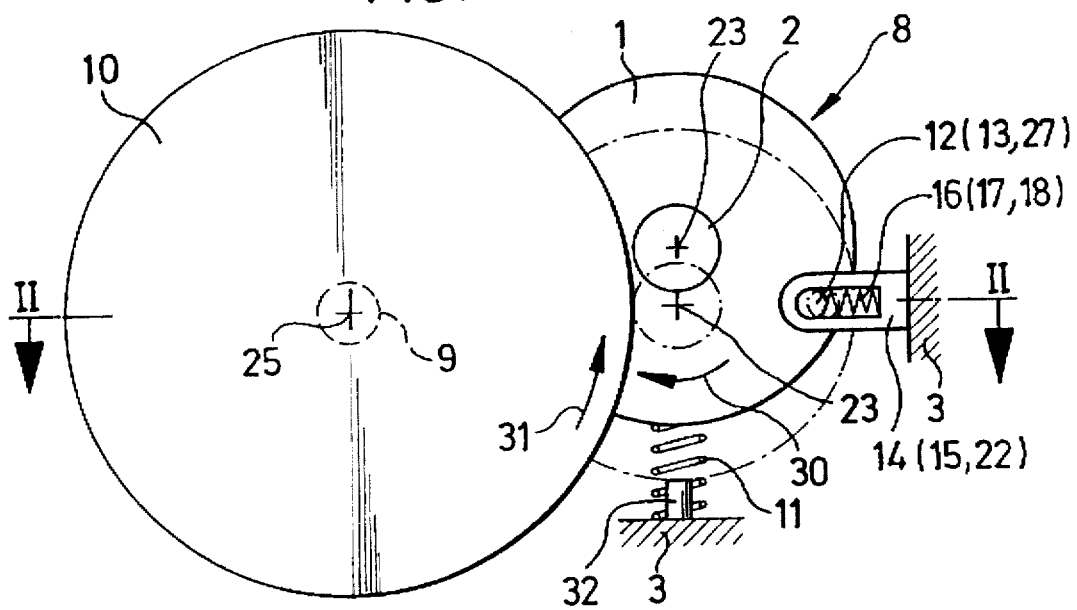
FIG. 1 is a diagrammatic side view of an embodiment of an arrangement according to the invention for driving a measuring spindle of a balancing machine.
Figure 2:
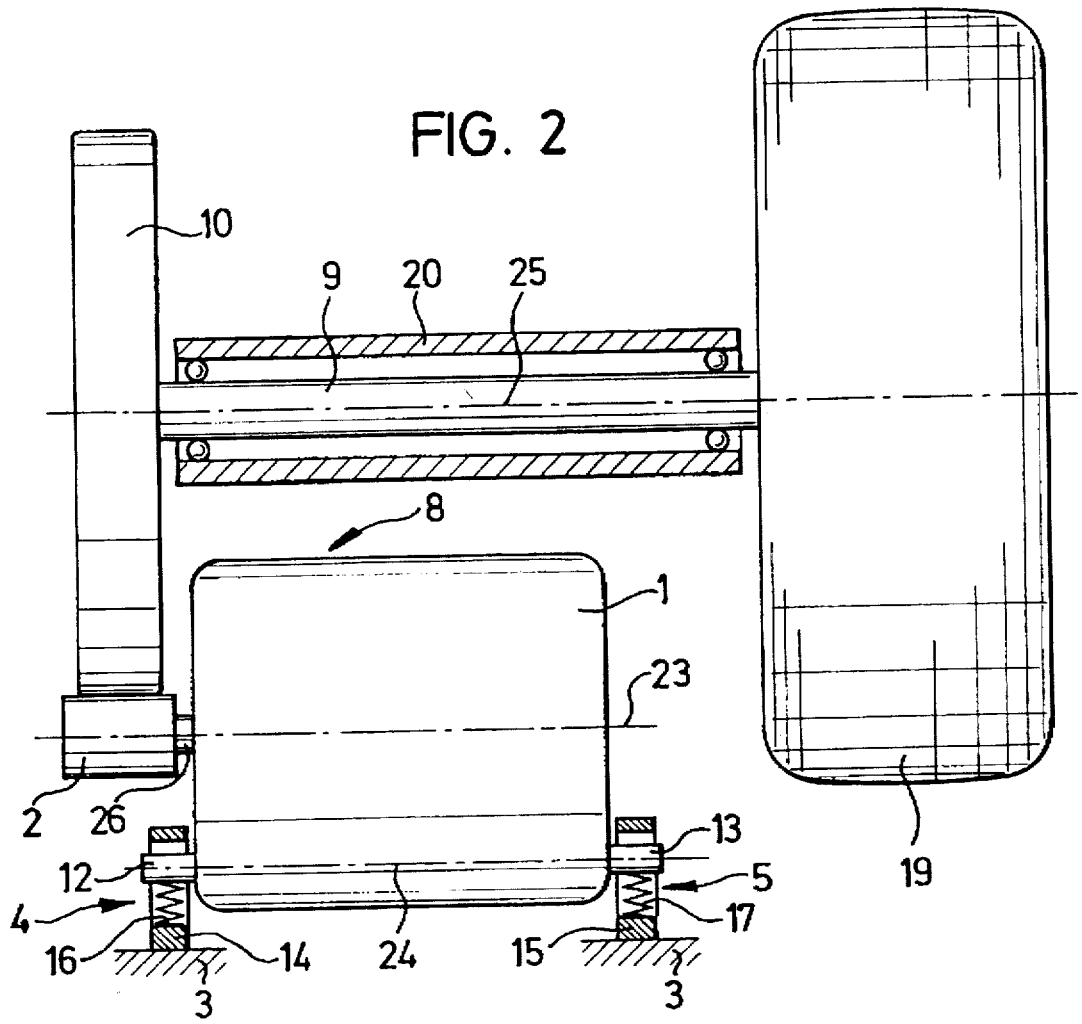
FIG. 2 is a view of the FIG. 1 arrangement taken along section line II—II in FIG. 1.

Referring firstly to FIGS. 1 and 2, shown therein is part of a balancing machine for balancing a rotary member such as a motor vehicle wheel. Reference numeral 9 denotes a measuring spindle of the balancing machine, which is mounted in a measuring spindle support assembly as indicated at 20 in FIG. 2. For an unbalance measuring operation, a rotary member 19 such as a motor vehicle wheel is non-rotatably clamped on the measuring spindle 9 in the usual way. Reference numeral 10 denotes a drive wheel which is non-rotatably connected to the measuring spindle 9. During a measuring run, the measuring spindle 9 is rotated about its axis as indicated at 25 in FIGS. 1 and 2. The measuring spindle 9 is driven by means of the driving arrangement according to the invention as described below.

The driving arrangement according to the invention comprises an electric motor 1. A friction wheel 2 is non-rotatably connected to the rotor (not shown) of the electric motor 1 by way of an output shaft 26. A transmission unit such as a gear device may also be operatively connected between the friction wheel 2 and the electric motor rotor to provide a step-up or step-down effect in transmission of the drive from the electric motor 1 to the friction wheel 2. The friction wheel 2 and the electric motor i together form a unit which is referred to herein as a motion unit, as indicated at 8. The motion unit 8 can be moved from a rest position which is shown in solid lines in FIG. 1 and in which the friction wheel 2 is out of operative engagement with the drive wheel 10, into a driving position which is shown in dash-dotted lines in FIG. 1. In the driving position the friction wheel 2 and the drive wheel 10 are in frictional engagement with each other. The friction wheel 2 and/or the drive wheel 10 may be provided with a friction lining or covering thereon to enhance frictional interengagement thereof.

In the rest position, compensation of the weight of the motion unit 8 is provided by a spring 11 supported on the machine frame 3. The motion unit 8 is supported on the machine frame 3 by way of a mounting assembly which forms a pivot axis as indicated at 24 in FIG. 2. The pivot axis 24 is formed by mounting trunnions 12 and 13 fixed to the casing of the electric motor 1. The pivot axis 24 extends parallel to the axis 23 of the rotor of the electric motor 1, in displaced relationship with respect to the axis 23. The mounting trunnions 12 and 13 are supported in suitable trunnion guides indicated at 14 and 15 in FIG. 2. The trunnion guides 14 and 15 form linear guide means for the mounting trunnions 12 and 13 and thus for the pivot axis 24. The mounting trunnions 12 and 13 are biased by compression springs 16 and 17 in a direction for providing for frictional engagement of the friction wheel 2 with the drive wheel 10. The compression springs 16 and 17 produce a uniform constant contact pressure force as between the friction wheel 2 and the drive wheel 10 when they are in driving contact with each other. The mounting trunnions 12 and 13 guided in the trunnion guides 14 and 15 form first and second mounting locations 4 and 5 of the mounting arrangement for the motion unit 8.

Looking now at FIG. 3, the embodiment of the driving arrangement according to the invention is of the same general configuration as that described above with reference to FIGS. 1 and 2 and the same components in FIG. 3 are therefore denoted by the same reference numerals as those used in relation to the embodiment of FIGS. 1 and 2. In the FIG. 3 construction, however, the arrangement has a first mounting location 6 which is of the same general design configuration as the two mounting locations 4 and 5 of the embodiment described with reference to FIGS. 1 and 2. Thus, a mounting trunnion 27 is linearly movably guided in a trunnion guide 22, as is the case with the mounting trunnions 12 and 13 of the first embodiment. A compression spring 18 provides a biasing force in the direction of frictional engagement between the friction wheel 2 and the drive wheel 10.

At a second mounting location 7 in the FIG. 3 construction, a mounting pivot point 21 is formed for mounting the motion unit 8. The pivot axis 24 passes through the mounting pivot point 21 which is formed by a mounting bell 28 supported movably in a ball holder 29 supported on the machine frame 3.

The structure of the embodiment of the arrangement according to the invention having been described, the mode of operation thereof will now be set forth as follows:

When the electric motor 1 is switched on the rotor thereof is accelerated. As a result of that acceleration, the motion unit 8 is subjected to the action of a force which is supported by way of the motor casing at the mounting locations 4, 5 in the first embodiment of FIGS. 1 and 2 or 6, 7 in the second embodiment of FIG. 3, on the machine frame 3. That gives rise to a turning moment or torque which causes the motion unit 8 to be moved from the rest position illustrated in solid lines in FIG. 1 into the driving position shown in dash-dotted lines in FIG. 2. Due to the frictional engagement which then occurs between the friction wheel 2 and the drive wheel 10, the spindle 9 is accelerated to a desired speed. During the acceleration phase the above-mentioned force continues to act on the motion unit 8 about the pivot axis 24 formed by the mounting locations 4, 5 or 6, 7. The drive directions of the friction wheel 2 and the drive wheel 10 are indicated by the arrows 30 and 31 in FIG. 1. The frictional engagement between the friction wheel 2 and the drive wheel 10 occurs due to a counter-moment which acts between those two components and which is maintained throughout the entire acceleration phase of the rotor of the electric motor. That counter-moment is caused by the acceleration of the driven system consisting of the rotary member 19, the spindle 9 and the drive wheel 10.

During the condition of frictional engagement between the friction wheel 2 and the drive wheel 10, a constant contact pressure force between the two wheels 2 and 10 is guaranteed by the compression springs 16 and 17 of the embodiment shown in FIGS. 1 and 2 or the compression spring 18 in the embodiment of FIG. 3. The operative direction of the compression springs 16, 17 or 18 is disposed approximately in a plane in which the axis of rotation of the driving friction wheel 2, which axis in the illustrated embodiments coincides with the axis of rotation 23 of the rotor of the electric motor 1, and the axis of rotation 25 of the measuring spindle 9 as well as the pivot axis 24, are disposed. The motion unit 8, for example, the casing of the electric motor 1, bear in the acceleration phase against an abutment as indicated at 32 in FIG. 1.

As soon as the desired final or target speed of rotation of the measuring spindle 9 is reached, the rotor of the electric motor 1, the friction wheel 2 and the rotary member 19 being balanced are no longer accelerated. The force with which the motion unit 8 is held in the driving position is then no longer operative.

With that force no longer being applied, the motion unit 8 is returned to the rest position in which it is in a condition of equilibrium. As already discussed above with reference to FIG. 1, that equilibrium can be achieved by virtue of the weight compensating arrangement in the form of the spring 11 in FIG. 1 or, alternatively, by virtue of the motion unit 8 being suspended in the mounting arrangement in a pendulum-like fashion.

When the driving arrangement is uncoupled from the measuring spindle 9 by virtue of the motion unit 8 moving beck into its rest position, the measuring spindle 9 continues to rotate in a run-down phase. During that phase an unbalance measuring operation can be carried out on the rotary member 19 being balanced in the usual fashion, for example as described in above-mentioned U.S. Pat. No. 4,480,472.

It will be appreciated that the above-described embodiments of the arrangement according to the present invention have been set forth solely by way of example and illustration thereof and that various other modifications and alterations may be made therein without thereby departing from the spirit and scope of the invention.

What is claimed is:

1. An arrangement for driving a measuring spindle of a balancing machine including a machine frame structure for rotatably supporting said spindle, the arrangement comprising:

a clamping device constructed and arranged to detachably fix a rotary member to be measured on the measuring spindle;

a drive wheel non-rotatably connected to the measuring spindle;

a friction wheel constructed and arranged to be moved into and out of a frictional driving relationship with the drive wheel of the measuring spindle;

an electric motor, including a rotor, drivingly connected to the friction wheel, wherein the electric motor and the friction wheel constitute a motion unit;

a support structure constructed and arranged to movably support the motion unit at a pivot axis on the machine frame structure, the pivot axis being arranged in displaced relationship and substantially parallel relative to an axis of the rotor of the electric motor, the arrangement being such that a torque acting on said motion unit is generated about the pivot axis by the rotor of the electric motor while the rotor is accelerated to move the motion unit into the frictional driving relationship between the friction wheel and said drive wheel of the measuring spindle; and an abutment operatively disposed on the machine frame, said motion unit bearing against the abutment during acceleration of the rotor of the electric motor.

2. An arrangement as set forth in claim 1 wherein the motion unit is mounted on the machine frame structure in such a way that the driving relationship between the friction wheel and the measuring spindle is automatically terminated by termination of the acceleration of the rotor of the electric motor.

3. An arrangement as set forth in claim 1 wherein said driving relationship is adapted to be maintained by virtue of a counteracting moment produced upon frictional connection between the friction wheel and the spindle.

4. An arrangement as set forth in claim 1 including a weight-compensating means for holding the motion unit in equilibrium in a rest position thereof.

5. An arrangement as set forth in claim 4 wherein the weight-compensating means comprises a spring supported on the machine frame structure.

6. An arrangement as set forth in claim 1 wherein said support structure is constructed and arranged to support and mount the motion unit resiliently relative to the machine frame structure.

7. An arrangement as set forth in claim 1 wherein the motion unit is mounted to said support structure at first and second mounting locations.

8. An arrangement as set forth in claim 7 comprising means for mounting the motion unit resiliently at at least one of said first and second mounting locations.

9. An arrangement as set forth in claim 1, wherein said motion unit is pivotally mounted to the support structure about said pivot axis.

10. An arrangement as set forth in claim 9 wherein the pivot axis of said support structure is disposed at least substantially parallel to the axis of the rotor of the electric motor.

11. An arrangement as set forth in claim 1 wherein said motion unit is mounted for at least substantially linear movement at said first mounting location and for pivotal movement at said second mounting location.

12. An arrangement as set forth in claim 7 wherein said support structure comprises means for mounting the motion unit for at least substantially linear movement at both of said mounting locations.

13. An arrangement as set forth in claim 11 wherein one of said mounting locations is adapted for linear guidance of the motion unit at least substantially in a plane in which an axis of the measuring spindle and an axis of the friction wheel are disposed when the friction wheel is in the frictional driving relationship with the measuring spindle.

14. An arrangement as set forth in claim 12 wherein said mounting locations are adapted for linear guidance of the motion unit at least substantially in a plane in which an axis of the measuring spindle and an axis of the friction wheel are disposed when the friction wheel is in the frictional driving relationship with the measuring spindle.

15. An arrangement as set forth in claim 2 wherein an axis of the friction wheel and the axis of the rotor of the electric motor coincide.

16. An arrangement as set forth in claim 1 wherein the friction wheel is non-rotatably connected to the rotor of the electric motor.

17. An arrangement as set forth in claim 1 including a spring structure for mounting the motion unit in the support structure with a spring biasing operatively in a direction of a drive connection between the friction wheel and the measuring spindle.

18. A balancing machine for balancing a rotary member comprising
a machine frame,
a measuring spindle rotatably supported by said machine frame,
means on the measuring spindle for mounting thereon the rotary member to be balanced,
an arrangement for rotatably driving said measuring spindle, said arrangement including a friction wheel constructed and arranged to move into and out of a frictional driving relationship with a part of said measuring spindle, an electric motor, including a rotor, for rotationally driving the friction wheel, the electric motor and the friction wheel constituting a motion unit, and a support structure for movably supporting the motion unit at a pivot axis on the machine frame, the pivot axis being arranged in displaced relationship relative to an axis of the rotor of the electric motor, the arrangement being such that the motion unit is movable by a torque, generated about the pivot axis by the rotor of the electric motor when the rotor is accelerated, into the frictional driving relationship between the friction wheel and the part of the measuring spindle, and
an abutment operatively disposed on the machine frame structure, said motion unit bearing against the abutment during acceleration of the rotor of the electric motor.

19. An arrangement for driving a measuring spindle of a balancing machine including a machine frame structure for rotatably supporting said spindle, the arrangement comprising:

a clamping device constructed and arranged to detachably fix a rotary member to be measured on the measuring spindle;

a drive wheel non-rotatably connected to the measuring spindle;

a friction wheel constructed and arranged to be moved into and out of a frictional driving relationship with the drive wheel of the measuring spindle;

an electric motor, including a rotor, drivingly connected to the friction wheel, wherein the electric motor and the friction wheel constitute a motion unit; and a support structure constructed and arranged to movably support the motion unit at a pivot axis on the machine frame structure, the pivot axis being arranged in displaced relationship and substantially parallel relative to an axis of the rotor of the electric motor, the arrangement being such that a torque acting on said motion unit is generated about the pivot axis by the rotor of the electric motor while the rotor is accelerated to move the motion unit into the frictional driving relationship between the friction wheel and said drive wheel of the measuring spindle, wherein said support structure includes a resiliently biased mounting apparatus constructed and arranged to resiliently bias said friction wheel into frictional engagement with said drive wheel when said friction wheel and said drive wheel are in the frictional driving relationship.

20. An arrangement as set forth in claim 19 wherein said resiliently biased mounting apparatus comprises first and second mounting units, at least one of said first and second mounting units comprising a mounting trunion extending from said motion unit, a trunion guide supported by said machine frame structure for supporting said mounting trunion and defining a linear guide structure for said mounting trunion, said mounting trunion being rotatable and linearly moveable within said trunion guide, and a spring biasing said mounting trunion within said trunion guide in a direction to resiliently bias said friction wheel into frictional engagement with said drive wheel when said friction wheel and said drive wheel are in the frictional driving relationship.

21. An arrangement as set forth in claim 20 wherein at least one of said first and second mounting units comprises a ball extending from said motion unit and a ball holder supported by said machine frame structure, said ball being rotatably held by said ball holder.

22. An arrangement as set forth in claim 19, wherein the motion unit is mounted on the machine frame structure in such a way that the driving relationship between the friction wheel and the measuring spindle is automatically terminated by termination of the acceleration of the rotor of the electric motor.

23. An arrangement as set forth in claim 19, wherein said driving relationship is adapted to be maintained by virtue of a counteracting moment produced upon frictional connection between the friction wheel and the drive wheel.

24. An arrangement as set forth in claim 19 including a weight compensating means for holding the motion unit in equilibrium in a rest position thereof.

25. An arrangement as set forth in claim 24, wherein the weight compensating means comprises a spring supported on the machine frame structure.

26. An arrangement as set forth in claim 19 wherein said motion unit is pivotally mounted to the support structure about said pivot axis.

27. An arrangement as set forth in claim 26 wherein the pivot axis of said support structure is disposed at least substantially parallel to the axis of the rotor of the electric motor.

28. An arrangement as set forth in claim 19 wherein an axis of the friction wheel and the axis of the rotor of the electric motor coincide.

29. An arrangement as set forth in claim 19 wherein the friction wheel is non-rotatably connected to the rotor of the electric motor.

30. An arrangement as set forth in claim 20 wherein said linear guide structure of said at least one mounting unit is constructed and arranged such that linear movement of said mounting trunion within said trunion guide is substantially coplanar with both an axis of the measuring spindle and an axis of the friction wheel when the friction wheel is in the frictional driving relationship with the measuring spindle.

* * * * *